United States Patent

Aldridge et al.

(10) Patent No.: US 7,793,513 B2
(45) Date of Patent: Sep. 14, 2010

(54) CONFIGURABLE PTAC CONTROLLER WITH ALTERNATE TEMPERATURE SENSORS

(75) Inventors: Richard L. Aldridge, Louisville, KY (US); Michael X. Song, Louisville, KY (US); Tedd P. Johnson, La Crosse, WI (US)

(73) Assignee: Trane International Inc., Piscataway, NJ (US)

( * ) Notice: Subject to any disclaimer, the term of this patent is extended or adjusted under 35 U.S.C. 154(b) by 744 days.

(21) Appl. No.: 11/489,423

(22) Filed: Jul. 19, 2006

(65) Prior Publication Data

US 2008/0017723 A1 Jan. 24, 2008

(51) Int. Cl.
*F25D 23/12* (2006.01)
*F25B 41/00* (2006.01)
(52) U.S. Cl. .......................................... 62/263; 62/208
(58) Field of Classification Search .................. 62/180, 62/127, 129, 153, 298; 236/51, 49.3, 46, 236/47, 91, 91 F; 165/204, 209, 258; 340/588, 340/589, 593; 700/258, 276, 282, 299, 300
See application file for complete search history.

(56) References Cited

U.S. PATENT DOCUMENTS

| | | | | |
|---|---|---|---|---|
| 4,637,223 A | * | 1/1987 | Hosoya et al. | 62/263 |
| 5,012,973 A | * | 5/1991 | Dick et al. | 236/46 R |
| 5,039,009 A | | 8/1991 | Baldwin et al. | |
| 5,203,497 A | * | 4/1993 | Ratz et al. | 236/46 R |
| 5,224,648 A | | 7/1993 | Simon et al. | |
| 5,276,630 A | | 1/1994 | Baldwin et al. | |
| 5,299,430 A | * | 4/1994 | Tsuchiyama | 62/180 |
| 5,326,027 A | * | 7/1994 | Sulfstede | 236/51 |
| 5,341,988 A | | 8/1994 | Rein et al. | |
| 5,390,206 A | * | 2/1995 | Rein et al. | 375/130 |
| 5,395,042 A | * | 3/1995 | Riley et al. | 236/46 R |
| 5,446,453 A | | 8/1995 | Nagamoto et al. | |
| 5,802,863 A | * | 9/1998 | Cowans | 62/211 |
| 5,927,599 A | * | 7/1999 | Kath | 236/47 |
| 6,009,939 A | * | 1/2000 | Nakanishi et al. | 165/209 |
| 6,378,317 B1 | * | 4/2002 | Ribo | 62/186 |
| 6,449,533 B1 | * | 9/2002 | Mueller et al. | 700/276 |
| 6,902,117 B1 | * | 6/2005 | Rosen | 236/51 |
| 2003/0066897 A1 | * | 4/2003 | Carner et al. | 236/51 |

* cited by examiner

*Primary Examiner*—Frantz F Jules
*Assistant Examiner*—Emmanuel Duke
(74) *Attorney, Agent, or Firm*—William O'Driscoll

(57) ABSTRACT

A refrigerant PTAC system, such as those commonly found in hotel rooms, can be selectively configured in a hardwire or wireless configuration with respect to its thermostat. The system is controlled in response to the better of two temperature sensors, which is determined based on the PTAC's configuration and the validity of the readings provided by the sensors. While the PTAC is controlled in response to a preferred temperature sensor, the alternate sensor may be monitored for diagnostics or other reasons. In the event that the preferred sensor fails to provide valid readings, the controller automatically switches to controlling the system in response to the alternate sensor. To minimize manufacturing costs and the variety of stocked parts, the PTAC's controller preferably includes two substantially identical transceivers.

5 Claims, 3 Drawing Sheets

CONFIGURABLE PTAC CONTROLLER WITH ALTERNATE TEMPERATURE SENSORS

BACKGROUND OF THE INVENTION

1. Field of the Invention

The subject invention generally pertains to PTAC refrigerant systems such as those commonly used for hotel rooms. The invention more specifically pertains to a way of selectively configuring the system for local or remote control.

2. Description of Related Art

Packaged Terminal Air Conditioners/Heat Pumps or PTACs, as they are known in the HVAC industry, are self-contained refrigerant systems often used for cooling and heating hotel rooms; however, they are also used in a variety of other commercial and residential applications such as apartments, hospitals, nursing homes, schools, and government buildings. PTACs are usually installed in an opening of a building's outer wall, so an exterior-facing refrigerant coil can exchange heat with the outside air.

In warmer climates, PTACs might only be used for cooling. In cooler climates, however, the refrigerant side of the system may be a heat pump for heating or cooling. PTACs may also include an electric heater if the refrigerant system lacks a heating mode or if the heat pump is unable to meet the heating demand of particularly cold days. PTAC's are also available with a hydronic (water/steam) heating option.

To control the temperature of a room, PTACs can be controlled in response to a temperature sensor that is usually installed in one of two locations. The temperature sensor can be installed within the PTAC's housing itself or in a thermostat mounted to a wall or some other remote location in the room. Both locations have their advantages and disadvantages.

Installing the sensor within the PTAC's housing is usually less expensive and simplifies the installation of the system. In such a location, however, the sensor may not necessarily provide the best temperature reading, as the temperature is being sensed at the elevation and vicinity of where the heating or cooling is occurring rather than at the location of the occupants in the room. Moreover, since PTACs are usually mounted along an outside wall and usually beneath a window, the temperature of the outside air and sunshine through the window can affect the sensor.

A wall-mounted sensor, on the other hand, can be spaced apart from the window, outside wall, and PTAC housing, and it can be installed closer to the occupants. Thus, a wall-mounted sensor may provide a reading that more accurately represents the room's overall temperature. In the case of a hotel installation, a temperature sensor installed within a wall-mounted thermostat may resemble thermostats that room guests have in their own homes, which can provide the guests with a more familiar, home-like environment, rather than an impersonal hotel atmosphere. Wall-mounted thermostats, unfortunately, are generally more expensive to install due to behind-the-wall wiring that is normally run between the thermostat and the rest of the PTAC unit.

To avoid or minimize the cost of the added wiring, some remotely mounted thermostats communicate via a wireless communication link. Even so-called wireless wall-mounted thermostats, however, still need a power source, which may require behind-the-wall wiring or batteries. Batteries may eliminate the wiring but can be a nuisance to replace. Moreover, since some users still prefer the less expensive PTAC units with a built-in temperature sensor, it can be expensive for a PTAC manufacturer to provide and stock both types of PTAC units, i.e., those with and without remote temperature sensing.

Some manufactures provide thermostats that can be selectively mounted locally or remotely. With such systems, the temperature sensor is normally contained within the thermostat's housing, which may be fine if the thermostat is remotely mounted to a wall. If, on the other hand, the thermostat is installed where the heating or cooling occurs, the best location for the temperature sensor may be directly upstream of the system's heat exchanger, but that may be impossible if the temperature sensor is still contained and sheltered within the thermostat's housing.

Consequently, there is still a need for a practical and effective PTAC system whose thermostat can be selectively installed locally or remotely without sacrificing its ability to sense the air temperature at the best available location.

SUMMARY OF THE INVENTION

It is an object of the invention to provide a PTAC refrigerant system that can be selectively configured in a hardwire or wireless configuration to communicate with a local or remote temperature sensor.

Another object of some embodiments is to enable a PTAC microprocessor controller to selectively respond to the better of two temperature sensors.

Another object of some embodiments is to have a controller employ two interchangeable wireless transceivers or two interchangeable hardwire transceivers.

Another object of some embodiments is to provide a PTAC controller with two individual microprocessors each communicating with its own temperature sensor, such that the two microprocessors can be readily spaced apart for wireless communication.

Another object of some embodiments is to have two temperature sensors such that the most appropriate sensor depends on whether the system is in a wireless or hardwire configuration.

Another object of some embodiments is to control a PTAC system in response to a preferred temperature sensor while monitoring an alternate sensor. In the event of a failure associated with the preferred sensor, the PTAC is automatically switched to being controlled in response to the alternate sensor.

One or more of these and/or other objects of the invention are provided by a refrigerant PTAC system that can be selectively configured in a hardwire or wireless configuration. The system is controlled in response to the better of two temperature sensors, which is determined based on the PTAC's configuration and the validity of the readings provided by the sensors.

DESCRIPTION OF THE PREFERRED EMBODIMENT

Figure 1:
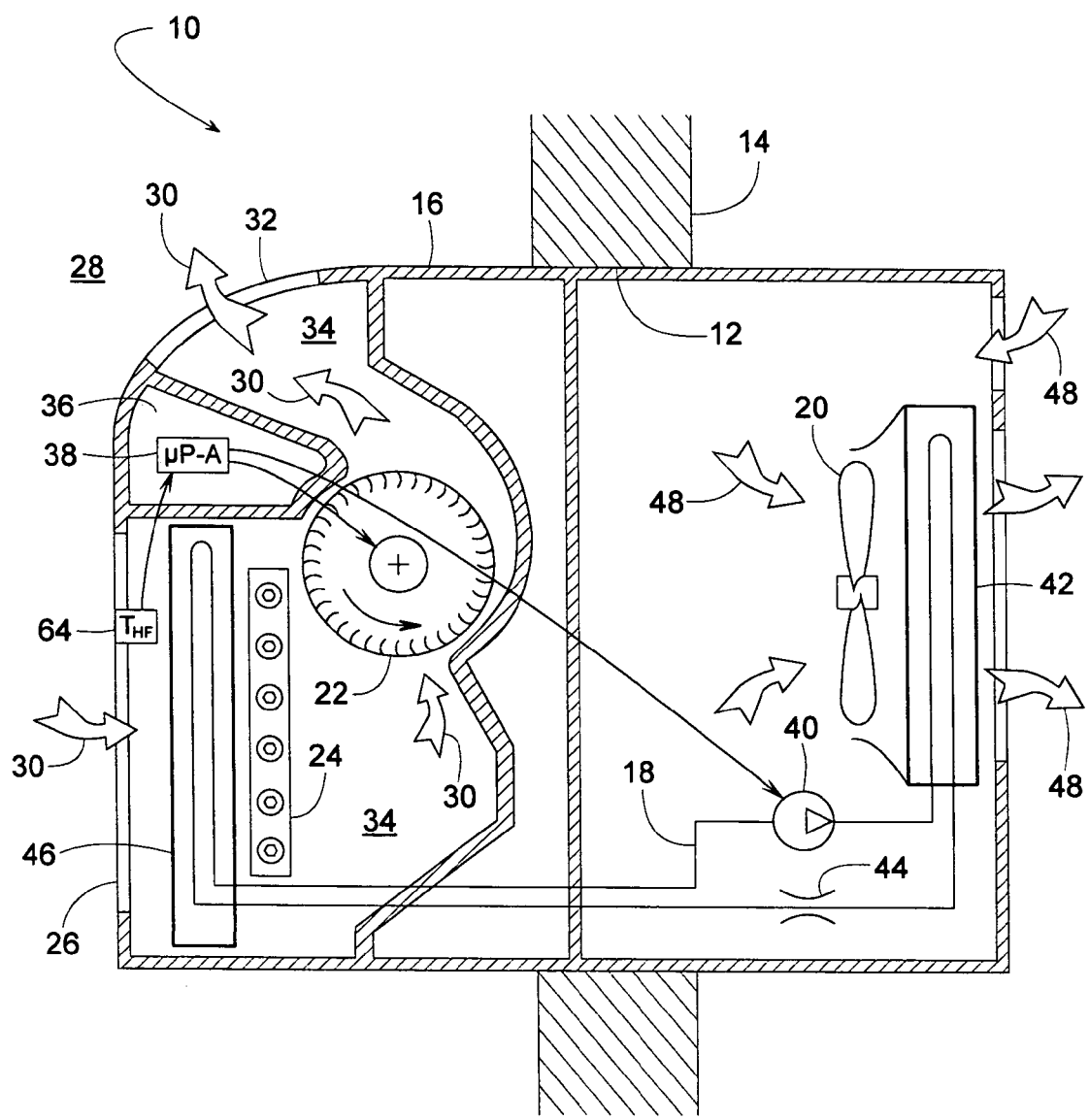
FIG. 1 is a schematically illustrated cross-sectional side view of a PTAC refrigerant system according to one embodiment of the invention.

Although PTACs come in various designs, FIG. 1 illustrates one example of a refrigerant PTAC system 10 installed at an opening 12 of a building's exterior wall 14. System 10 has an outer housing 16 that contains a refrigerant circuit 18, an outdoor fan 20, a supply air blower 22, and an optional electric heater 24. Housing 16 defines an inlet 26 for receiving a current of air 30 from within a room 28 or other area to be conditioned, an outlet 32 for discharging conditioned air 30 back into room 28, a supply air chamber 34 for conveying air 30 from inlet 26 to outlet 32, and a controls chamber 36 for housing a primary microprocessor 38 and other electrical components that help control or power the operation of system 10.

Refrigerant circuit 18 of system 10 comprises a compressor 40 for compressing refrigerant, an outdoor refrigerant heat exchanger 42, an expansion device 44 (e.g., thermal expansion valve, electronic expansion valve, orifice, capillary, etc.), and an indoor refrigerant heat exchanger 46. In a cooling mode, compressor 40 forces refrigerant sequentially through outdoor heat exchanger 42 functioning as a condenser to cool the refrigerant with outdoor air 48 moved by fan 20, through expansion device 44 to cool the refrigerant by expansion, and through indoor heat exchanger 46 functioning as an evaporator to absorb heat from indoor air 30 (and/or some outside air) moved by blower 22.

If refrigerant circuit 18 is a heat pump system operating in a heating mode, the refrigerant's direction of flow through heat exchanger 42, expansion device 44 and heat exchanger 46 is generally reversed so that indoor heat exchanger 46 functions as a condenser to heat air 30, and outdoor heat exchanger 42 functions as an evaporator to absorb heat from outdoor air 48. If additional heat is needed or refrigerant circuit 18 is only operable in a cooling mode, heater 24 can be energized for heating air 30.

In this particular example, blower 22 forces air 30 sequentially through inlet 26, supply air chamber 34, and outlet 32. Upon passing through supply air chamber 34, air 30 passes sequentially through indoor heat exchanger 46, heater 24, and blower 22. To help prevent high volumes of air 30 from depositing dust on the electrical components in controls chamber 36, most of air 30 travels through supply air chamber 34 and bypasses controls chamber 36. While PTACs may include dampers and other well-known means for mixing air 30 with fresh outside air 48 or for altering the air's flow path, such dampers and other means are not shown in the drawing figures so that the basic elements of the invention can be illustrated and understood more clearly.

Figure 2:
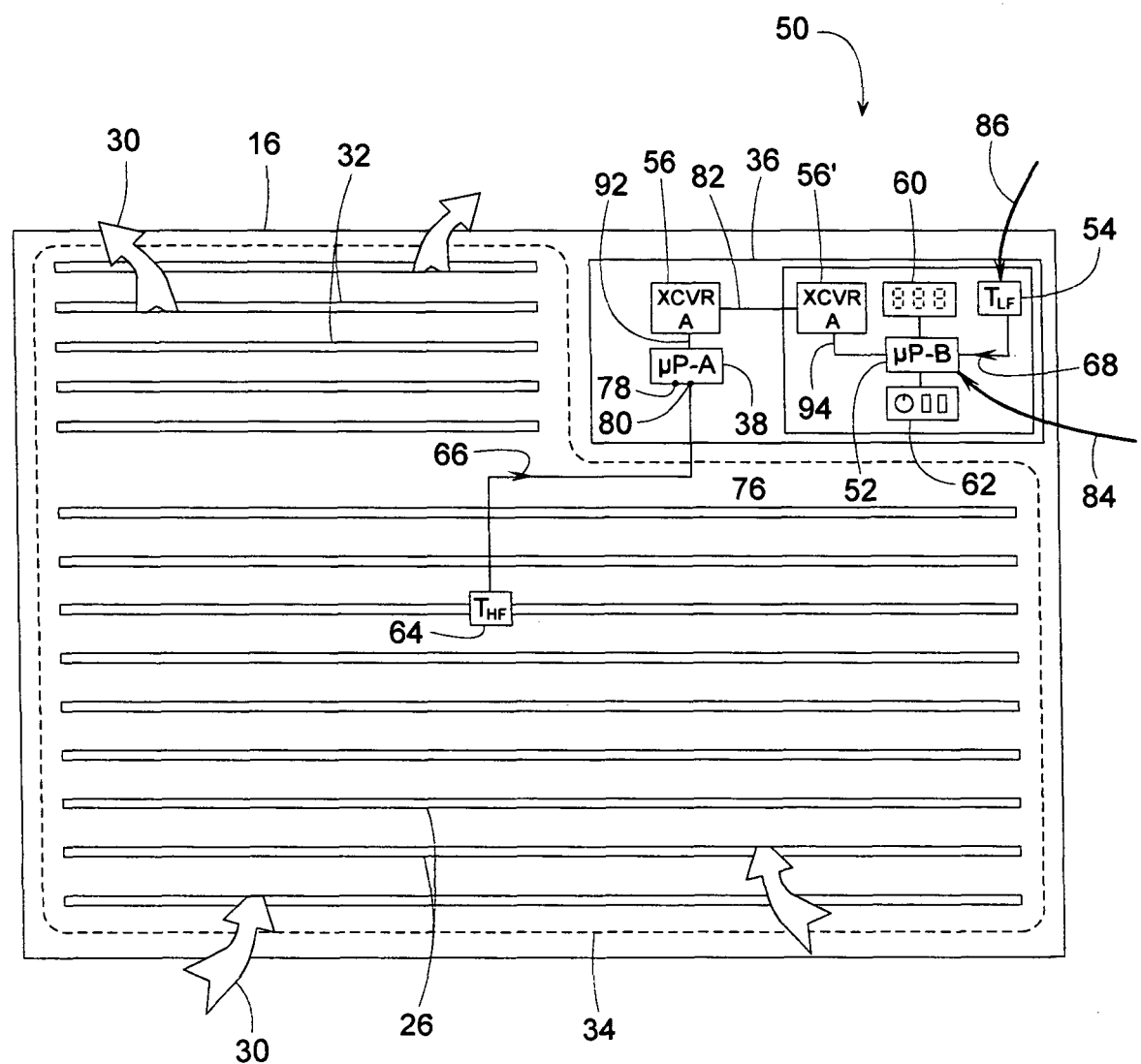
FIG. 2 is a front schematic view of FIG. 1 with the PTAC system in a hardwire configuration.
Figure 3:
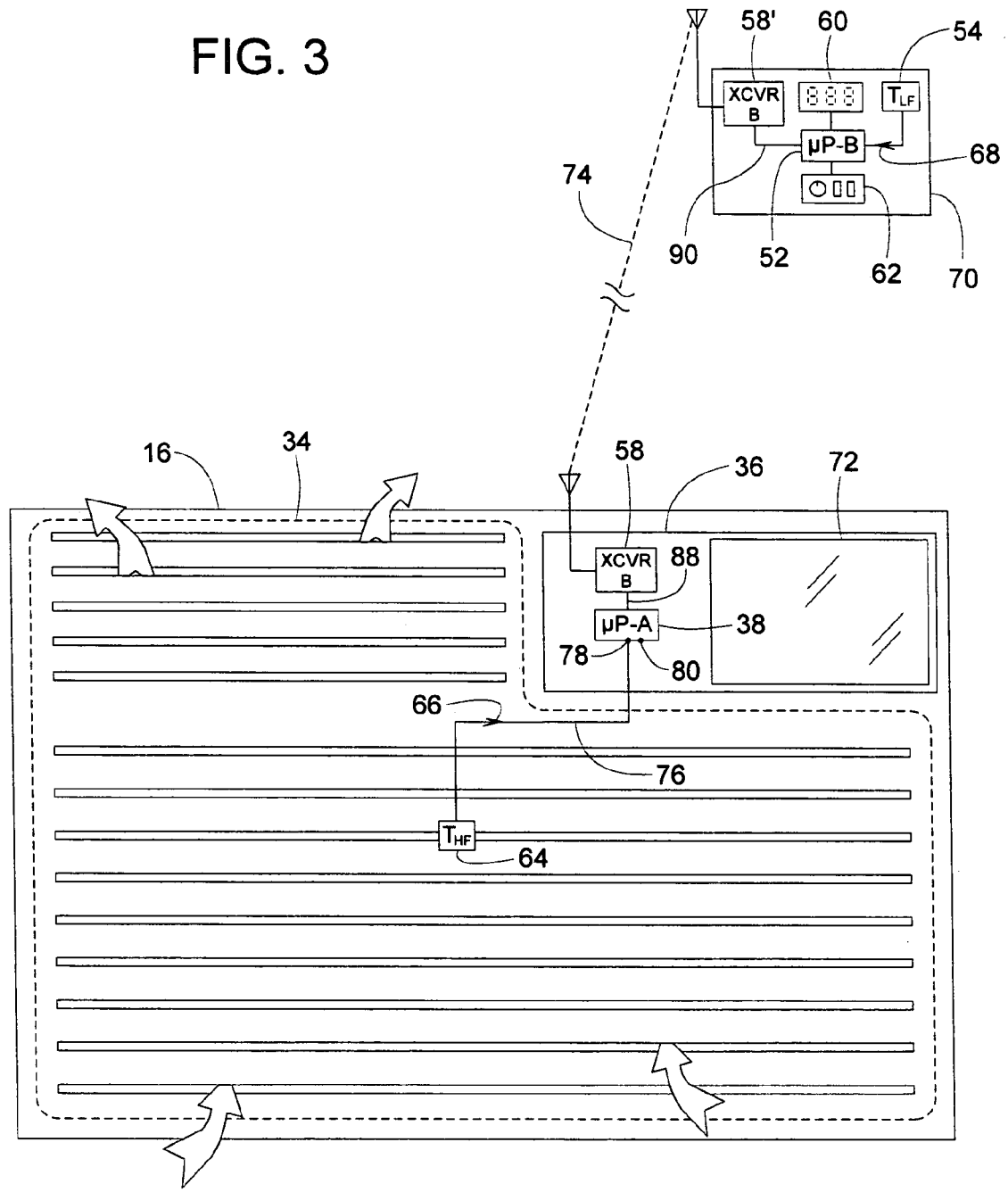
FIG. 3 is a front schematic view of FIG. 1 with the PTAC system in a remote wireless configuration.

PTAC system 10 is selectively configurable in a hardwire configuration (one example shown in FIG. 2) or a wireless configuration (one example shown in FIG. 3). The term, "hardwire" and its derivatives refer to communication that does not rely on signals being transmitted through the air over a distance that extends appreciably beyond housing 16. Examples of hardwire include, but are not limited to, conventional metal wires, semiconductors, plugs and sockets, terminals, switches, optical isolators contained within housing 16, fiber optics, etc. The term, "wireless" and its derivatives refer to a communication signal that travels through the air between housing 16 and a separate element (e.g., a wall-mounted thermostat) spaced apart from housing 16. Examples of wireless include, but are not limited to, infrared transmission, radio waves, and other electromagnetic radiation.

In the hardwire configuration of FIG. 2, a control circuit 50 controls the operation of compressor 40, blower 22 and perhaps other components associated with refrigerant circuit 18. Circuit 50 comprises primary microprocessor 38, a supplementary microprocessor 52, a high airflow temperature sensor 64, a low airflow temperature sensor 54, a first transceiver 56, a second transceiver 56', an output device 60, and a user input device 62. To sense an air temperature that is close to the overall air temperature of the room, high airflow sensor 64 is preferably installed upstream of indoor heat exchanger 46 and heater 24.

Sensors 64 and 54 are respectively referred to as a "high airflow" and "low airflow" temperature sensors simply because sensor 64 is more directly positioned in the main current of air 30 and is thus exposed to higher airflow rates than the more sheltered low airflow temperature sensor 54. Nonetheless, sensors 54 and 64 both sense the temperature of air 30. When operating properly, sensor 64 provides primary microprocessor 38 with a high airflow temperature reading 66 that is preferably within a predetermined valid range of values, and sensor 54 provides supplementary microprocessor 62 with a low airflow temperature reading 68 that is also preferably within a predetermined valid range of values.

Supplementary microprocessor 52 also receives a desired setpoint temperature and perhaps other information from user input device 62. Examples of such other information include, but are not limited to, fan speed, cooling/heating mode, ventilation mode, etc. Input device 62 can be in the form of a selector switch, push buttons, touch pad, or any other interface that enables a user to enter information into microprocessor 52. To provide the user with visual feedback of various settings and operating conditions associated with system 10, output device 60 is wired to supplementary microprocessor 52. Output device 60 may assume various forms including, but not limited to, an alphanumeric liquid crystal display, LED display, indicator lights, etc.

To communicate the desired setpoint temperature, low airflow temperature reading 68, and perhaps other information between microprocessors 38 and 62, the two microprocessors are in hardwire communication with each other via transceivers 56 and 56'.

Since the hardwire configuration of FIG. 2 places low airflow temperature sensor 54 in relatively stagnant air that is rather close to where air 30 is being heated or cooled, high airflow temperature sensor 64 is the preferred sensor for controlling compressor 40 and blower 22 in the hardwire configuration. Thus, if primary microprocessor 38 determines that high airflow temperature reading 66 is valid, primary microprocessor 38 will use high airflow temperature sensor 64 in controlling compressor 40 and blower 22 and will just monitor low airflow reading 68 for diagnostics, data logging, or other reasons. If, however, primary microprocessor 38 determines that high airflow temperature reading 66 is abnormal or beyond a predetermined valid range of values, primary microprocessor 38 will switch over to controlling compressor 40 and blower 22 in response to low airflow temperature sensor 54 instead.

In the wireless configuration of FIG. 3, low airflow temperature sensor 54, supplementary microprocessor 52, user input device 62 and output device 60 are removed from within controls chamber 36 and installed in the room at a remote location within a wall-mountable thermostat housing 70, which is spaced apart from housing 16. A cover plate 72 can be used to cover the void left in controls chamber 36. To communicate the desired setpoint temperature, low airflow temperature reading 68, and perhaps other information between microprocessors 38 and 52, two transceivers 58 and 58' couple the two microprocessors 38 and 52 in wireless communication with each other via a wireless communication link 74.

Since wireless configuration of FIG. 3 places the low airflow temperature sensor in a more desirable location, low airflow temperature sensor 54 is the preferred sensor for controlling compressor 40 and blower 22 in the wireless configuration. Thus, if microprocessor 38 or 52 determines that low airflow temperature reading 68 is valid, primary microprocessor 38 will use low airflow temperature sensor 54 in controlling compressor 40 and blower 22 and will just monitor high airflow reading 66 for diagnostics, data logging, or other reasons. If, however, microprocessor 38 or 52 determines that low airflow temperature reading 68 is abnormal or beyond a predetermined valid range of values, primary microprocessor 38 will switch over to controlling compressor 40 and blower 22 in response to high airflow temperature sensor 64 instead.

Although the actual component of microprocessors 38 and 52, and transceivers 56 and 58 may vary, in a currently preferred embodiment, primary microprocessor 38 is an HD39014 (e.g., HD64F39014-GFXV) provided by Renesas Technology Corp. of Tokyo, Japan; supplementary microprocessor 52 is an HD64F38102 also provided by Renesas Technology Corp; wireless transceiver 58 is a CC1100 (ZigBee protocol) provided by Chipcon of Oslo, Norway (acquired by Texas Instruments of Dallas, Tex.); and hardwire transceiver 56 is an ADM4850 provided by Analog Devices of Norwood, Mass.

To minimize the variety of parts a manufacture needs to stock, in some embodiments certain parts are substantially identical (i.e., interchangeable), such as transceivers 56 and 56', transceivers 58 and 58', or temperature sensors 54 and 64.

Switching from the hardwire configuration of FIG. 2 to the wireless configuration of FIG. 3 may require minor changes to the electrical circuit. In some embodiments, for instance, a temperature signal wire 76 connecting high airflow temperature sensor 64 to primary microprocessor 38 may need to be rerouted from a first input terminal 80 on microprocessor 38 to a second terminal 78. This can be done in various ways including, but not limited to, physically reconnecting wire 76 or by using dip-switches, jumpers, etc.

Microprocessors 52 and 64 can be programmed with software-based algorithms that perform one or more of the following functions: directing primary microprocessor 38 to communicate with supplementary microprocessor 52 via a hardwired communication link 82 in the hardwire configuration (FIG. 2); directing primary microprocessor 38 to control supply air blower 22 and compressor 40 in response to high airflow temperature sensor 64 in the hardwire configuration (FIG. 2); determining whether a valid high airflow temperature reading 66 from high airflow temperature sensor 64 fails to be communicated to primary microprocessor 38 while in the hardwire configuration (FIG. 2), and in the event of such failure, redirecting primary microprocessor 38 to control supply air blower 22 and compressor 40 in response to low airflow temperature sensor 54 during the hardware configuration (FIG. 2); directing primary microprocessor 38 to communicate with supplementary microprocessor 52 via wireless communication link 74 in the wireless configuration (FIG. 3); directing primary microprocessor 38 to control supply air blower 22 and compressor 40 in response to low airflow temperature sensor 54 in the wireless configuration (FIG. 3); determining in the wireless configuration (FIG. 3) whether a valid low airflow temperature reading 68 fails to be communicated to microprocessor 38 and 52, and in the event of such failure, redirecting primary microprocessor 38 to control supply air blower 22 and compressor 40 in response to high airflow temperature sensor 64 during the wireless configuration (FIG. 3); monitoring low airflow temperature sensor 54 while in the hardwire configuration (FIG. 2) even though primary microprocessor 38 is controlling supply air blower 22 and compressor 40 in response to high airflow temperature sensor 64; and/or monitoring high airflow temperature sensor 64 while in the wireless configuration (FIG. 3) even though primary microprocessor 38 is controlling supply air blower 22 and compressor 40 in response to low airflow temperature sensor 54. The actual software code for performing the aforementioned functions as well as control algorithms for controlling the operation of a refrigerant compressor and supply air blower in response to a sensed room temperature and desired setpoint temperature can be readily written by those of ordinary skill in the art.

In FIG. 2, arrow 84 schematically illustrates the step of installing supplementary microprocessor 52 within controls chamber 36, and arrow 86 schematically illustrates the step of installing low airflow temperature sensor 54 within controls chamber 36 along with primary microprocessor 38 and supplementary microprocessor 52. FIG. 3 schematically illustrates the steps of positioning supplementary microprocessor 52 at a location that is spaced apart from PTAC housing 16 and positioning low airflow temperature sensor 54 at a position that is spaced apart from PTAC housing 16. Line 88 of FIG. 3 illustrates the step of hardwiring transceiver 58 to primary microprocessor 38 when the PTAC system is in the wireless configuration, line 90 illustrates the step of hardwiring transceiver 58' to supplementary microprocessor 52 when the PTAC system is in the wireless configuration, and link 74 represents the step of placing first transceivers 58 and 58' in communication with each other via wireless communication link 74. Line 92 of FIG. 2 illustrates the step of hardwiring transceiver 56 to primary microprocessor 38 when the PTAC system is in the hardwired configuration, line 94 illustrates the step of hardwiring transceiver 56' to supplementary microprocessor 52 when the PTAC system is in the hardwired configuration and line 82 illustrates the step of hardwiring transceiver 56 to transceiver 56' to enable communication between primary microprocessor 38 and supplementary microprocessor 52.

Although the invention is described with respect to a preferred embodiment, modifications thereto will be apparent to those of ordinary skill in the art. Therefore, the scope of the invention is to be determined by reference to the following claims.

The invention claimed is:

1. A refrigerant Packaged Terminal Air Conditioners (PTAC) system for conditioning a current of air from a room, the refrigerant PTAC system is selectively configurable in a hardwire configuration and a wireless configuration, the refrigerant PTAC system comprising:

a housing defining a supply air chamber and a controls chamber;

a compressor disposed within the housing;

a condenser disposed within the housing;

an evaporator disposed within the supply air chamber;

a supply air blower disposed within the supply air chamber for forcing the current of air across the evaporator;

a high airflow temperature sensor in heat transfer relationship with the current of air from the room;

a primary microprocessor disposed within the controls chamber and hardwired to the high airflow temperature sensor;

a low airflow temperature sensor sensing a temperature of the room;

an output device for displaying an actual temperature of the room;

a user input device for entering a desired setpoint temperature; and a supplementary microprocessor hardwired to the user input device, the output device, and the low airflow temperature sensor, wherein the supplemental microprocessor is in communication with the primary microprocessor such that:

a) in the hardwire configuration, the primary microprocessor is hardwired to the supplementary microprocessor, the high airflow temperature sensor is inside the housing, the low airflow temperature sensor is inside the housing, and the primary microprocessor controls the compressor and the supply air blower in response to the high airflow temperature sensor, b) in the wireless configuration, the primary microprocessor and the supplementary microprocessor communicate via a wireless communication link therebetween, the high airflow temperature sensor is inside the housing, the low airflow temperature sensor is outside the housing, and the primary microprocessor controls the compressor and the supply air blower in response to the low airflow temperature sensor, c) the high airflow temperature sensor provides a high airflow temperature reading, and in the event that the high airflow temperature reading goes beyond a predetermined valid range of values while in the hardwire configuration, the primary microprocessor switches from controlling the compressor and the supply air blower in response to the high airflow temperature sensor to controlling the compressor and the supply air blower in response to the low airflow temperature sensor, and d) the low airflow temperature sensor provides a low airflow temperature reading, and in the event that the low airflow temperature reading goes beyond a predetermined valid range of values while in the wireless configuration, the primary microprocessor switches from controlling the compressor and the supply air blower in response to the low airflow temperature sensor to controlling the compressor and the supply air blower in response to the high airflow temperature sensor.

2. The refrigerant PTAC system of claim 1, further comprising a first transceiver hardwired to the primary microprocessor and a second transceiver hardwired to the supplementary microprocessor, the first transceiver and the second transceiver are substantially the same and hardwired to each other in the hardwire configuration.

3. The refrigerant PTAC system of claim 1, further comprising a first transceiver hardwired to the primary microprocessor and a second transceiver hardwired to the supplementary microprocessor, the first transceiver and the second transceiver are substantially the same and communicate with each other via the wireless communication link in the wireless configuration.

4. The refrigerant PTAC system of claim 1, wherein at least one of the primary microprocessor and the supplementary microprocessor monitors the low airflow temperature sensor while the refrigerant PTAC system is in the hardwire configuration.

5. The refrigerant PTAC system of claim 1, wherein the primary microprocessor monitors the high airflow temperature sensor while the refrigerant PTAC system is in the wireless configuration.

* * * * *